United States Patent [19]

Gordon

[11] Patent Number: 4,627,461
[45] Date of Patent: Dec. 9, 1986

[54] SELF CLEANING VALVE

[75] Inventor: Patrick J. Gordon, Cromer, Australia

[73] Assignee: K. J. Baillie Pty. Ltd., New South Wales, Australia

[21] Appl. No.: 783,433

[22] Filed: Oct. 3, 1985

[51] Int. Cl.[4] .................. F16K 29/00; F16K 31/50
[52] U.S. Cl. .................... 137/243.1; 51/241 VS; 74/23; 74/89.15; 74/424.8 VA; 137/243.2; 137/331; 251/129.11; 251/229; 251/267; 464/40
[58] Field of Search .................. 74/424.8 VA, 23, 24, 74/89.15; 137/243, 243.1, 243.2, 243.5, 243.6, 330, 331; 251/266, 267, 239; 51/27, 29, 30, 241 VS; 464/40, 162

[56] References Cited

U.S. PATENT DOCUMENTS

| | | | |
|---|---|---|---|
| 1,232,461 | 7/1917 | Eckenroth | 137/243.2 |
| 1,404,103 | 1/1922 | Eckenroth | 137/243.2 |
| 2,996,075 | 8/1961 | Deimer et al. | 137/243 |
| 4,177,825 | 12/1979 | Crawford | 137/243.2 |
| 4,338,961 | 7/1982 | Karpenko | 137/243.2 |
| 4,346,728 | 8/1982 | Sulzer | 74/424.8 VA |

Primary Examiner—George L. Walton
Attorney, Agent, or Firm—Birch, Stewart, Kolasch & Birch

[57] ABSTRACT

A self-cleaning valve has its closure member rotated against a valve seat during closing, by an externally threaded spindle rotated by an actuator. The spindle has a threaded portion screwed through an internally threaded collar which is pressed by a spring towards the valve seat. When the member engages the valve seat further rotation of the spindle causes the collar to ride up the spindle against the spring bias which maintains the closing force on the member while allowing it to rotate to clean the closing surfaces.

3 Claims, 1 Drawing Figure

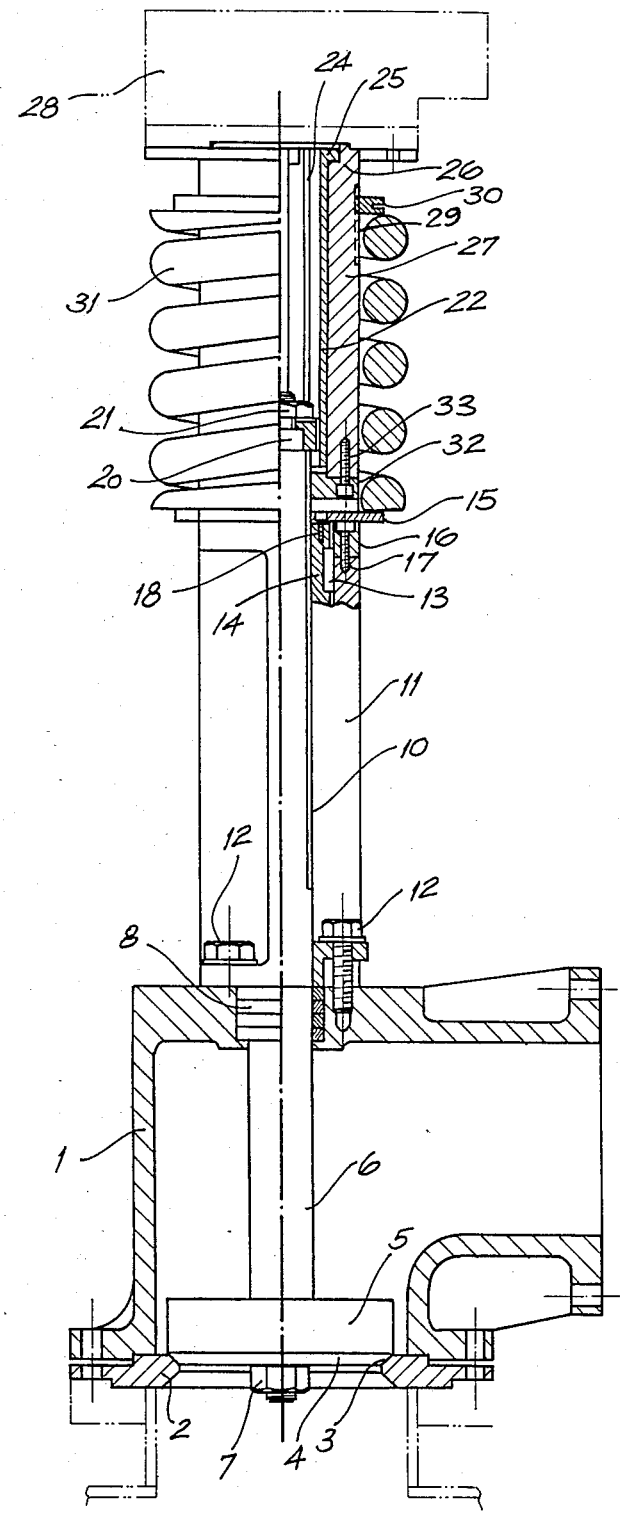

4,627,461

SELF CLEANING VALVE

FIELD OF THE INVENTION

This invention relates to a fluid-flow control valve and is more specifically concerned with one having a circular valve seat on which deposits can build up to impair effective closing of the valve.

In, for example, the refining of aluminium, valves are required to control the flow of liquids containing highly caustic materials which cause caustic build up on the valve seat. Similar situations occur in other industries and this has led to the development of valves which have what are termed "self-cleaning" characteristics on closing.

STATE OF THE ART

One form of self-cleaning valve uses a circular closure member which is rotated in its own plane as it approaches the valve seat. During the terminal part of the movement towards the valve seat the rotation of the closure member grinds away any sediment which has built up on the seat so that mating surfaces of the closure and seat bear against one another when the valve is closed to provide an effective seal between a liquid inlet and a liquid outlet of the valve.

Self-cleaning valves operating on the above principle, are often controlled by electrically-driven actuators. These are required to exert sufficient torque to grind away any build up of deposits, as well as close the valve. It is important that the actuator is de-energized when the torque it exerts attains a value signifying that closure movement of the valve has been successfully accomplished, so that the parts of the valve through which the torque is transmitted are not strained.

The conventional method of ensuring the actuator does not damage parts of the valve is to incorporate a clutch between the actuator and the closure member and which slips and disconnects the electrical supply to the actuator when the torque exceeds a predetermined value.

The incorporation of clutches into a self-cleaning valve involves a complex design of valve with parts which slip on one another and are therefore prone to wear.

OBJECT OF THE INVENTION

It is an object of this invention to provide an improved self-cleaning valve mechanism.

SUMMARY OF THE INVENTION

A self-cleaning valve, in accordance with the broadest aspect of the invention, has an actuator energizable to move a spindle of a circular valve closure member from its open position to its closed position while simultaneously rotating the closure member about its axis of symmetry to grind away any material deposited on mating surfaces of the closure member and a valve seat against which the closure member seals when the valve is closed, the valve incorporating a cushioning mechanism which includes a reaction element for absorbing the reaction of the spindle during terminal closing movement of the valve and providing a predetermined force on the valve seat, the element being displaceable against a stiffly resilient but yieldable force which absorbs the torque of the actuator after the closure member has reached its fully-closed position.

PREFERRED FEATURES OF THE INVENTION

In the preferred valve of the invention the cushioning effect is obtained by axial movement of an internally-threaded collar through which an externally-threaded spindle of the valve closure member is threaded.

A self-cleaning valve, in accordance with a narrower aspect of the invention, has an actuator energizable to move a threaded spindle of a valve-closure member between its open and closed positions with simultaneous axial displacement and rotation of the spindle, the spindle passing through an internally threaded collar which is constrained against rotation about the spindle axis but which can displace axially against a resilient force when the valve is closed to provide a cushioning effect which allows the torque of the actuator to progressively increase to a point at which a torque-sensing device de-energizes the actuator. The resilient force in the narrower aspect of the invention, combined with rotation of the valve closure member, causes matter deposited on the valve seat, such as caustic particles, to be dislodged from opposed mating surfaces of the valve so they are washed away by fluid passing through the valve during its closing movement.

The advantage of the invention is that the working parts of the valve are not strained by the torque of the actuator when the closure member completes its closing movement and the use of slipping clutches is avoided. As fewer parts are required in the valve of the invention, and wear is reduced, the valve is more reliable in operation, than one using a clutch. It can also be more cheaply made.

Preferably the resilient force is provided by a coil compression spring of adjustable compression.

IN THE DRAWING

The invention will now be described in more detail, by way of example, with reference to the accompanying drawing which shows a liquid-flow control valve partly in elevation and partly in section as viewed from one side.

DESCRIPTION OF PREFERRED EMBODIMENT

The self-cleaning valve illustrated comprises a housing 1 containing an annular valve seat 2 having a frusto-conical sealing surface 3 for engagement with a complementary frusto-conical sealing surface 4 provided on the underside of circular valve closure member 5. A valve operating spindle 6 has a square cross-section portion extending through the member 5 which is held in place by a nut 7. The nut 7 is constrained against rotation by welding. The spindle 6 extends upwardly through a packed gland 8 in the housing 1. Above the housing the spindle 6 is externally threaded at 10 and passes upwards through a surrounding cylindrical casing 11 which is bolted at its lower end at 12 to the top of the housing 1.

The casing 11 has a key 13 arranged vertically inside its upper end-portion and on which an internally threaded collar 14 is vertically slidable while being prevented by the key 13 from rotating inside the casing 11. The collar 14 has at its upper end a radial flange 15 which normally seats on a cap-ring 16 bolted at 17 to the top of the casing 11. The collar 14 and flange 15 are bolted to one another at 18.

The spindle 6 is threaded where it passes through the collar 14 and carries at its upper end a drive nut 20 which has a "square" machined in it matching a machined square on the spindle. The nut 20 is securely held to the top of the spindle 6 by a nut 21 so that it cannot rotate with respect to the spindle 6.

The drive nut 20 is held captive inside a thin cylindrical driving sleeve 22 formed with vertical driving slots 24 which engage the corners of the drive nut 20 so that the nut, and thus the spindle, can move axially inside the rotating driving sleeve 22 but cannot rotate with respect to it.

The upper end of the sleeve 22 has an outwardly turned rim flange 25 which rests on an annular stepped bearing surface 26 formed at the upper inner end of a tubular housing 27. The upper end of the housing 27 is attached to the underside of an electrical actuator gearbox 28 containing a toothed drive ring (not shown) which meshes with a ring with two teeth (also not shown) on the upper surface of the rim flange 25.

The tubular housing 27 is externally threaded at 29 to carry an adjustable nut 30 which holds in place the upper end of a coil compression spring 31. The spring 31 extends down around the outside of the tubular housing 27 and engages at its lower end the upper surface of the radial flange 15. An inwardly directed rim flange 32 is bolted at 33 to the lower rim of the tubular housing 27. Flange 32 is also bolted to the cap-ring 16, although this is not shown in the drawing.

OPERATION OF THE PREFERRED EMBODIMENT

The valve operates as follows.

Opening rising movement of the closure member 5 is effected by the actuator rotating the sleeve 22 in a direction which causes the spindle 6 to screw itself upwardly through the internally threaded collar 14 which provides the reaction force against which the spindle moves axially.

Closing movement of the valve is effected by driving the sleeve 22 in the reverse direction. As the closure member 5 descends, it is rotated in its own plane by the interaction with the collar 14 so that as it approaches the valve seat 3 any build up of deposits on the opposed sealing surfaces 3,4 is ground away until the opposed surfaces 3 and 4 abut one another to complete closing movement of the valve. At the moment that this occurs the actuator continues to rotate despite further downward axial movement of the spindle 6 being prevented. Any sudden strain on the valve parts is prevented by the cushioning effect of the collar 14 providing the reaction element. This rides upwardly on the threads of the spindle 6 against the yielding resilient bias of the coil compression spring 31. A progressive, rather than a sudden increase in torque resistance therefore occurs, and is determined in part by the pitch of the spindle threads and in part by the compression of the spring 31 which is adjusted to a chosen value by the nut 30 bearing on its upper end. The compression of the spring is preset at a value which causes a torque sensing switch (not shown) in the actuator and the gearbox 28 to respond to the progressive increase in torque which occurs when the valve is fully closed, by de-energizing the actuator.

The above described valve has the advantage that the closing load on the sealing surfaces 3 and 4 and the operational parts of the valve has an upper limit which is set at a value at which straining and possible deformation of these parts is prevented without the use of wearing components. Also the use of a complex design of valve, inherent if a slipping clutch is used to achieve the same result, is avoided.

I claim:

1. A fluid control valve having an actuator, a valve seat, a circular closure member cooperating with said valve seat to control fluid flow through the valve, a spindle turned by said actuator and provided with an externally threaded section and having said closure member at its lower end, a sleeve turned at its upper end by said actuator and rotating said spindle which extends into its lower end, a formation on the upper end of said spindle engaging the interior of said sleeve which is shaped to allow said formation to slide axially in said sleeve without relative rotation occurring therebetween, a housing provided with upper and lower tubular coaxially arranged and spaced casings one of which contains said sleeve and the other of which surrounds said threaded section of said spindle, an internally threaded collar screwed onto said threaded section of said spindle and having a part which engages with the surrounding casing in a way which constrains said collar to move axially but without rotation in the surrounding casing when the spindle is rotated by the sleeve, a flange extending radially outwards from said collar between said two casings with sufficient clearance to allow axial movement of said collar in a direction away from said valve seat, an adjustment nut screwed onto a threaded section of one of the surrounding casings, and a coil spring coaxially surrounding the casing carrying the nut and engaging said nut at one end and said flange at the other end to exert a resilient bias urging said spindle towards said valve seat while yielding resiliently to allow movement of said collar in a direction away from said valve seat.

2. A valve as claimed in claim 1, in which said nut is adjustable to vary the compression of said spring which surrounds said upper casing.

3. A valve as claimed in claim 2, in which said spring offers a progressively increasing resistance to compression and electrical switching means responsive to the torque generated by the actuator de-energizes the actuator at a predetermined torque.

* * * * *